United States Patent
Abdulkhair et al.

(10) Patent No.: US 12,497,291 B1
(45) Date of Patent: Dec. 16, 2025

(54) METHOD OF PRODUCING HYDROGEN GAS THROUGH SODIUM BOROHYDRIDE HYDROLYSIS USING NANOCOMPOSITE CATALYST

(71) Applicant: IMAM MOHAMMAD IBN SAUD ISLAMIC UNIVERSITY, Riyadh (SA)

(72) Inventors: Babiker Yagoub Elhadi Abdulkhair, Riyadh (SA); Mohamed Khairy Omran, Riyadh (SA); Mohamed Nady Abd El-Hameed Ibrahim, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/244,490

(22) Filed: Jun. 20, 2025

(51) Int. Cl.
| | |
|---|---|
| *C01B 3/06* | (2006.01) |
| *B01J 23/10* | (2006.01) |
| *B01J 27/24* | (2006.01) |
| *B01J 35/45* | (2024.01) |
| *B01J 35/61* | (2024.01) |
| *B01J 35/63* | (2024.01) |
| *B01J 35/64* | (2024.01) |
| *B01J 37/03* | (2006.01) |
| *B01J 37/04* | (2006.01) |
| *B01J 37/08* | (2006.01) |

(52) U.S. Cl.
CPC ........... *C01B 3/065* (2013.01); *B01J 23/10* (2013.01); *B01J 27/24* (2013.01); *B01J 35/45* (2024.01); *B01J 35/613* (2024.01); *B01J 35/633* (2024.01); *B01J 35/647* (2024.01); *B01J 37/031* (2013.01); *B01J 37/04* (2013.01); *B01J 37/088* (2013.01)

(58) Field of Classification Search
CPC .. C01B 3/065; B01J 23/10; B01J 27/24; B01J 35/45; B01J 35/613; B01J 35/633; B01J 35/647; B01J 37/031; B01J 37/04; B01J 37/088
See application file for complete search history.

(56) References Cited

FOREIGN PATENT DOCUMENTS

| | | |
|---|---|---|
| CN | 103130182 B | 8/2015 |
| CN | 113856735 A | 12/2021 |
| CN | 114225955 B | 8/2024 |

OTHER PUBLICATIONS

Wang et al., Chemical Engineering Journal, (2021), v.460, 141667(1-8).*
Jiangfeng Xu, et al. "The well-designed wollastonite-ZnIn2S4 composite photocatalysts for efficient hydrogen production", Progress in Natural Science: Materials International, Jan. 2025, 7 Pages.
Yanhong Wang, et al., "Designing novel 0D/1D/2D NiO@La(OH)3/g-C3N4 heterojunction for enhanced photocatalytic hydrogen production", Chemical Engineering Journal, vol. 460, Mar. 15, 2023, 141667, 8 Pages.

* cited by examiner

*Primary Examiner* — Yong L Chu
(74) *Attorney, Agent, or Firm* — Oblon, McClelland, Maier & Neustadt, L.L.P.

(57) ABSTRACT

A method of producing hydrogen gas by hydrolyzing sodium borohydride ($NaBH_4$) with water at a temperature of about 20 to 75° C. in the presence of a particulate crystalline nanocomposite catalyst, wherein the ratio by weight of $NaBH_4$ to the particulate crystalline nanocomposite catalyst is from about 1:1 to about 5:1. The particulate crystalline nanocomposite catalyst comprises: a hexagonal lanthanum hydroxide ($La(OH)_3$) crystalline phase; a lanthanum oxide ($La_2O_3$) crystalline phase; a monoclinic calcium silicate ($CaSiO_3$) crystalline phase; and, a graphitic carbon nitride ($g-C_3N_4$) crystalline phase, wherein at least a fraction of the $g-C_3N_4$ is in the form of mesoporous nanosheets.

18 Claims, 6 Drawing Sheets

METHOD OF PRODUCING HYDROGEN GAS THROUGH SODIUM BOROHYDRIDE HYDROLYSIS USING NANOCOMPOSITE CATALYST

BACKGROUND

Technical Field

The present disclosure is directed to a method of producing hydrogen gas and, more particularly, to a method of producing hydrogen gas via catalytic hydrolysis of sodium borohydride using a $La(OH)_3/La_2O_3/CaSiO_3/g-C_3N_4$ particulate crystalline nanocomposite catalyst.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The tremendous industrialization and population increase in recent years have led to a search for alternate energy sources to meet the expanding energy demand. Primarily, the depletion of non-renewable energy resources and environmental concerns are compelling societies to switch to clean, renewable energy sources. On account of its high energy density (120 megajoules per kilograms (MJ/kg)), non-toxicity, and ecological friendliness, hydrogen gas has emerged as an important energy carrier among renewable sources.

While solar energy generation is inexpensive, the storage of this energy incurs costs due to a reliance on batteries, which require frequent replacement and pose challenges in their safe disposal. Conversely, hydrogen energy provides numerous advantages over batteries in terms of energy conservation and powering diverse applications. A key benefit is that that hydrogen possesses a higher energy density than conventional batteries, allowing it to store greater energy in a less volume: this renders hydrogen optimal for applications such as transportation, where weight and space are paramount. Refueling a hydrogen vehicle requires only a few minutes, akin to conventional gasoline automobiles, whereas charging batteries can be far more time-consuming. Hydrogen fuel cells, for instance, offer extended ranges relative to battery electric vehicles, rendering fuel-cell powdered vehicles appropriate for heavy-duty applications and long-distance journeys. In larger-scale vehicular applications, such as trucks or ships, hydrogen fuel cells may be lighter than comparable battery systems, which is essential for efficiency and payload capacity. Moreover, in contrast to batteries, which deteriorate over time and necessitate replacement, hydrogen systems can sustain performance for an extended duration with adequate maintenance. Hydrogen production can be amplified from renewable sources, potentially resulting in sustainable and extensive energy storage options: the generation of hydrogen through electrolysis utilizing solar or wind energy is an important example. Hydrogen derived from renewable sources furthermore provides a clean energy alternative, generating solely water vapor when utilized in fuel cells.

Hydrogen is applicable in other areas outside transportation, including industrial operations, heating, and energy storage, hence offering variety in energy solutions. Hydrogen can retain surplus renewable energy for extended durations, assisting in the equilibrium of supply and demand within the energy system. Hydrogen can stabilize the electrical grid by serving as a versatile energy storage solution, absorbing surplus energy during peak production periods.

Despite its inherent advantages, the difficulties in safely storing and transporting hydrogen have stymied its widespread utilization.

Hydrogen is typically stored either: under compression; as a liquid under deep refrigeration; through being chemically bound within a metal hydride; or, through being chemically bound within other compounds. Sodium borohydride ($NaBH_4$) has become an important compound for hydrogen storage given its stability, non-flammability and non-toxicity: $NaBH_4$ further contains two moles of hydrogen ($H_2$) and that hydrogen constitutes 10.8 wt. % of the compound.

When required, hydrogen is released from $NaBH_4$ by hydrolysis:

$$NaBH_4 + 2H_2O \rightarrow 4H_2 + NaBO_2 + Heat\ (300\ kJ)$$

According to this reaction, the hydrolysis releases the 2 moles of hydrogen bound within the $NaBH_4$, as well as hydrogen bound within the reactant water.

$NaBH_4$ may undergo self-hydrolysis but this occurs at a very slow reaction rate. Consequently, either heterogeneous or homogeneous catalysts are employed to drive the hydrolysis reaction at viable temperatures, such as temperatures close to room temperature. Heterogeneous catalysts are preferred in this context on the basis that they: typically possess longer functional lifetimes; can be facilely separated from the sodium metaborate ($NaBO_2$) solution formed as a co-product of the hydrolysis reaction; and, are not associated with the formation of gaseous side products, such as diborane.

Active heterogeneous catalysts for the hydrolysis process of sodium borohydride have predominantly been based on noble metals, such as Pt, Ru and Pd. [See: Huff C, Long J M, Heyman A, Abdel-Fattah T M (2018) *ACS Appl Energy Mater* 1:4635-4640; Brack P, Dann S E, Wijayantha K G U (2015) *Energy Sci Eng* 3:174-188; Wei L, Ma M, Wang D, Wang Q, Lu Y, Zhang S (2018) *Funct. Mater: Lett.* 11:1850079.] However such noble metals are associated with high costs, low abundance and toxicity [See Bullock R M (2017) *Chemistry* 2:444-446].

Accordingly, one objective of the present disclosure is to provide a composite material for hydrogen production via hydrolysis of sodium borohydride ($NaBH_4$). This method circumvents the aforementioned drawbacks and helps to achieve enhanced activity and efficiency in hydrogen generation.

SUMMARY

In an exemplary embodiment, a method of producing hydrogen gas is described. The method comprises hydrolyzing sodium borohydride ($NaBH_4$) with water at a temperature of from about 20 to 75 degrees Celsius (° C.) in the presence of a particulate crystalline nanocomposite catalyst. The ratio by weight of $NaBH_4$ to the particulate crystalline nanocomposite catalyst is from about 1:1 to about 5:1. The particulate crystalline nanocomposite catalyst comprises: a hexagonal lanthanum hydroxide ($La(OH)_3$) crystalline phase; a lanthanum oxide ($La_2O_3$) crystalline phase; a monoclinic calcium silicate ($CaSiO_3$) crystalline phase; and, a graphitic carbon nitride ($g-C_3N_4$) crystalline phase, wherein at least a fraction of the $g-C_3N_4$ is in the form of mesoporous nanosheets.

In some embodiments, the ratio by weight of $CaSiO_3$ to g-$C_3N_4$ to the sum of $La(OH)_3$ and $La_2O_3$ in the particulate crystalline nanocomposite is about (0.8-1.2):(0.8-1.2):(0.8-1.2).

In some embodiments, the particulate crystalline nanocomposite comprises acicular particles of $La(OH)_3$, $La_2O_3$, and $CaSiO_3$.

In some embodiments, the particulate crystalline nanocomposite comprises acicular particles of $La(OH)_3$, $La_2O_3$, and $CaSiO_3$ that have a median length of about 40 to 100 nanometers (nm), as determined by transmission electron microscopy (TEM).

In some embodiments, at least about 80 weight percent (wt. %) of the g-$C_3N_4$ is in the form of mesoporous nanosheets.

In some embodiments, the particulate crystalline nanocomposite has a surface area of about 60 to about 100 square meters per gram ($m^2$/g), as determined by the Brunauer-Emmett-Teller (BET) analysis.

In some embodiments, the particulate crystalline nanocomposite has a surface area of about 70 to about 90 $m^2$/g, as determined by BET analysis.

In some embodiments, the particulate crystalline nanocomposite has an average pore diameter of about 10 to about 25 nm, as determined by Barrett-Joyner-Halenda (BJH) desorption analysis.

In some embodiments, the particulate crystalline nanocomposite has an average pore diameter of about 10 to about 20 nm, as determined by Barrett-Joyner-Halenda (BJH) desorption analysis.

In some embodiments, the particulate crystalline nanocomposite has a pore volume of about 0.1 to about 0.4 cubic centimeters per gram ($cm^3$/g), as determined by BJH desorption analysis.

In some embodiments, the particulate crystalline nanocomposite has a pore volume of about 0.1 to about 0.3 $cm^3$/g, as determined by BJH desorption analysis.

In some embodiments, the particulate crystalline nanocomposite has a hysteresis loop of Type H3 (international union of pure and applied chemistry (IUPAC) Classification), as determined by $N_2$ adsorption-desorption analysis at 77K.

In another exemplary embodiment, the method of preparing the particulate crystalline nanocomposite is described. The method comprises: forming a solution of a calcium salt and an alkali metal silicate in a solvent including water and a $C_1$-$C_4$ alkanol; and, heating the solution at a temperature of from about 150 to about 250° C. to form a dry product of $CaSiO_3$. The method further comprises forming g-$C_3N_4$ by heating urea in a closed vessel at a temperature of about 500 to 700° C. The method further comprises: dispersing the $CaSiO_3$, g-$C_3N_4$, and $La_2O_3$ in a polar protic solvent; heating the dispersion at a temperature of from about 150 to 250° C. at a pressure of from about 2 to 8 bar; and, separating the solid crystalline nanocomposite from the heated dispersion.

In some embodiments, the ratio by weight of sodium borohydride to the particulate crystalline nanocomposite catalyst is from about 1:1 to about 3:1.

In some embodiments, $NaBH_4$ is hydrolyzed with water at a temperature of about 25 to about 70° C.

In some embodiments, $NaBH_4$ is hydrolyzed with water at a temperature of from about 35 to about 60° C.

In some embodiments, the method has a hydrogen generation rate of from about 100 to about 1500 milliliters per minute per gram (mL $min^{-1}$ $g^{-1}$) based on the weight of the $NaBH_4$.

In some embodiments, the method has a hydrogen generation rate of from about 200 to about 1500 mL $min^{-1}$ $g^{-1}$ based on the weight of the $NaBH_4$.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

As used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term "room temperature" refers to a temperature range of 23 degrees Celsius (° C.) t 2° C. in the present disclosure. As used herein, "ambient conditions" means the temperature and pressure of the surroundings in which the substance, composition or article is located.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., or 1° C.

As used herein, the term "fraction" refers to a numerical quantity which defines a part up to, but not including, 100 percent or the entirety of the thing in question.

As used herein the term "disposed" refers to being positioned, placed, deposited, arranged or distributed in a particular manner.

As used herein, the term number average molecular weight (Mn) and weight average molecular weight (Mw) are determined by gel permeation chromatography (GPC) with tetrahydrofuran (THF) as the eluent in accordance with DIN 55672-1:2007-08.

As used herein, the term "Scanning Electron Microscopy" or "SEM" refers to a surface-imaging technique that produces images of a sample by scanning the sample with a focused beam of electrons. Unless otherwise specified, the SEM shall include all imaging techniques using electron beams for imaging.

As used herein, the term "high-resolution transmission electron microscopy (HRTEM)" refers to a powerful imaging technique used to observe the fine details of materials at the atomic scale. In HRTEM, a high-energy electron beam is transmitted through a thin sample, and the transmitted electrons are used to form detailed images with extremely high resolution.

As used herein, the term "X-ray diffraction" or "XRD" or "X-ray crystallography" refers to basic technique for obtaining information on the atomic structure of crystalline materials used as a standard laboratory technique. Unless otherwise specified, the XRD shall include an analytical technique based on the diffraction of X-rays by matter, especially for crystalline materials.

As used herein with respect to X-ray diffraction analysis, "JCPDS" denotes the Joint Committee on Powder Diffraction Standards.

The term "unit cell" as used herein refers to the smallest and simplest volume element (i.e., parallelpiped-shaped block) of a crystal that is completely representative of the unit or pattern of the crystal, such that the entire crystal can be generated by translation of the unit cell. The dimensions of the unit cell are defined by six numbers: dimensions a, b and c; and, angles $\alpha$, $\beta$ and $\gamma$ (Blundel et al., 1976, *Protein Crystallography*, Academic Press, the disclosure of which is incorporated herein by reference in its entirety). A crystal is an efficiently packed array of many unit cells.

The term "triclinic crystalline phase" refers to a crystal structure in which the unit cell is characterized by three mutually perpendicular aces of unequal length ($a \neq b \neq c$) wherein further $\alpha \neq \beta \neq \gamma$.

An orthorhombic crystalline phase refers to a crystal structure having three mutually perpendicular axes of unequal lengths ($a \neq b \neq c$) but wherein the crystal lattice forms a rectangular prism where the edges represent the three axes, all intersecting at 90-degree angles ($\alpha = \beta = \gamma = 90°$).

A cubic crystalline phase refers to a crystal structure where the unit cell is shaped like a cube, with three equal-length axes that are perpendicular to each other (at 90° angles). In this crystal system, the atoms or ions are arranged in a repeating pattern within the cubic lattice. The cubic crystalline structure is highly symmetric, possessing four threefold rotational axes and three fourfold rotational axes, permitting rotations of 90° around its specific axes and rotations of 120° about the body diagonals of the cube, while maintaining the same structure.

A monoclinic crystalline phase refers to a crystal structure in which the unit cell of the material is characterized by three unequal axes, with two of them forming an angle that is not 90°, while the third axis is perpendicular to the plane formed by the other two axes. In other words, the monoclinic crystal system has one axis that is tilted, resulting in a lack of orthogonality between all three axes. The unit cell in the monoclinic phase is thus asymmetrical, with distinct axial lengths and one non-90° angle.

A tetragonal crystalline phase refers to a crystal structure in which the unit cell of the lattice has two axes of equal-length and a third axis that is of different length, but wherein all axes are at right angles (90°) to each other. This crystal system may be represented as a square base (with two equal axes) and a height (the third axis) which is different, resulting in a rectangular prism-like shape. The tetragonal crystal structure possesses a four-fold rotational symmetry around its unique axis.

As used herein, the term "average crystallite size" refers to the mean size of the crystalline domains or particles within a material. It is typically determined using X-ray diffraction (XRD) analysis, where the broadening of diffraction peaks is related to the size of the crystallites. The average crystallite size provides insight into the degree of crystallinity and the structural characteristics of the material. It is commonly expressed in nanometers (nm) and reflects the typical dimensions of the crystalline regions in the material, excluding any amorphous regions or defects.

As used herein, the term "particle" refers to a small object that acts as a whole unit with regard to its transport and properties. As used herein, "nanoparticles"—sometimes contracted herein to NPs—refers to particles having a particle size of 1 nanometer (nm) to 1000 nm.

Unless otherwise stated, the term "particle size" refers to the largest axis of the particle. In the case of a generally spherical particle, the largest axis is the diameter.

The term "median volume particle size" (Dv50), as used herein, refers to a particle size corresponding to 50% of the volume of the sampled particles being greater than and 50% of the volume of the sampled particles being smaller than the recited Dv50 value. Similarly, if used, the term "Dv90"

refers to a particle size corresponding to 90% of the volume of the sampled particles being smaller than and 10% of the volume of the sampled particles being greater than the recited Dv90 value. Particle size is determined herein by Scanning Electron Microscopy (SEM).

As used herein, the term "nanocomposite" refers to a composite material in which at least one dimension of a component thereof is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material.

As used herein, the term "porosity" refers to a measure of the void or vacant spaces within a material. As used herein, the term "pore volume" refers to the total volume of void spaces (pores) within a material that is capable of being filled by a gas or liquid: it is typically expressed in cubic centimeters per gram ($cm^3/g$). As used herein, the term "pore diameter" refers to the median width or size of the pores (void spaces) within a material, typically measured in nm or angstroms (Å).

Pores may be micropores, mesopores, macropores, and/or a combination thereof. The pores exist in the bulk material, not necessarily in the molecular structure of the material. The term 'microporous' means that particulate crystalline nanocomposite have pores with an average pore width (i.e., diameter) of less than 2 nm. The term 'mesoporous' means the pores of the nanocomposite have an average pore width of 2-50 nm. The term 'macroporous' means the pores of the nanocomposite have an average pore width larger than 50 nm. Pore size may be determined by methods including, but not limited to, gas adsorption (e.g., $N_2$ adsorption), mercury intrusion porosimetry, and imaging techniques such as SEM and X-ray computed tomography (XRCT).

Having regard to a parameter distribution of the disclosed material, the term "monomodal" references only one peak being observed in a frequency distribution graph of said parameter. The term "polymodal" references a distribution with two or more distinct peaks or modes. The terms bimodal and trimodal may be utilized herein to reference the presence of two or three modes, respectively.

As used herein, the Brunauer-Emmett-Teller (BET) analysis references the method of measuring the specific surface area ($m^2/g$) of a solid material via the adsorption of gas molecules onto the surface of the solid, as detailed in standard NF ISO 5794-1, Appendix E (June 2010).

As used herein, the Barrett, Joyner, and Halenda (BJH) desorption analysis refers to the method of determining the volume of mesopores per unit mass (mL/g) of a solid material utilizing the adsorption and desorption isotherms associated with gas molecules inside the mesopores of the solid, as detailed in Technical Standard DIN 66134: 1998-02.

As used herein, the term "porous particulate nanocomposite" refers to a material composed of discrete particles that form a structure with interconnected pores or voids. These pores allow for the passage of fluids or gases, contributing to the material's overall porosity. The composite typically consists of two or more distinct phases, which may include various inorganic or organic components, and is characterized by its unique morphology, such as irregularly shaped particles or aggregates.

The term "graphitic carbon nitride" often abbreviated to g-$C_3N_4$, refers to a family of carbon nitride compounds with a layered structure similar to graphene. Graphitic carbon nitride may be considered a synthetic polymer primarily composed of carbon and nitrogen, with some hydrogen impurities.

The term "powder", as used herein, means a composition that consists of finely dispersed solid particles that are free-flowing.

The term "dry" as used herein means comprising less than 5 wt. % of any compound or composition being in liquid form when measured at 25° C. under ambient conditions. For instance, the term "dry" includes comprising less than 3 wt. %, less than 2 wt. %, less than 1%, or even about 0% of said compound or composition being in liquid form when measured at 25° C. under ambient conditions. Exemplary such compounds or compositions include water, oils, organic solvents and other wetting agents.

The term "polar solvent" as used herein refers to a solvent having a dielectric constant (e) of more than 5 as measured at 25° C. The determination of dielectric constant (e) is known in the art: the use of measured voltages across parallel plate capacitors in such determinations may be mentioned. The term "polar solvent" may encompass both aprotic and protic solvents, wherein protic solvents are those solvents which are capable of yielding or accepting a proton and aprotic solvents are those solvents that do not yield or accept a proton.

Water, for use as a (co-)solvent or diluent herein, is intended to mean water of low solids content as would be understood by a person of ordinary skill in the art. The water may, for instance, be distilled water, demineralized water, deionized water, reverse osmosis water, boiler condensate water, or ultra-filtration water. Tap water may be tolerated in certain circumstances.

As used herein, 'comminuting' refers to process of reducing the average size of solid materials into smaller particles, by crushing, grinding, cutting, vibrating, or other processes.

The term "hydrolysis", as used herein, is the chemical reaction of a molecule with water to produce two or more smaller molecules.

As used herein, 'hydrogen generation rate' (HGR) refers to the amount of hydrogen gas produced per unit of time during a chemical reaction.

The term "sonication" refers to a process that uses sound energy (sonic waves) to agitate particles in a sample. As used herein, the term "ultrasonication" refers to irradiation with ultrasonic waves having a frequency of at least 20 kHz. Without intention to limit the present disclosure, (ultra) sonication may be performed using an (ultra)sonic bath or an (ultra)sonic probe.

As used herein, the term "calcination" refers to a thermal treatment process which is conducted in the absence of, or under a restricted supply of ambient oxygen. This is performed to remove impurities or volatile substances and/or to induce thermal decomposition or a change in the thermally treated material.

The term "actinic radiation" includes light with wavelengths of electromagnetic radiation ranging from the ultraviolet ("UV") light range, through visible light range, and into the infrared range. Actinic radiation generally has a wavelength of from 150 to 2000 nm.

As used herein, "$C_1$-$C_n$ alkyl" group refers to a monovalent group that contains from 1 to n carbons atoms, that is a radical of an alkane and includes straight-chain and branched organic groups. As such, a "$C_1$-$C_4$ alkyl" group refers to a monovalent group that contains from 1 to 4 carbons atoms, that is a radical of an alkane and includes straight-chain and branched organic groups. Examples of alkyl groups include, but are not limited to: methyl; ethyl;

propyl; isopropyl; n-butyl; isobutyl; sec-butyl; and, tert-butyl. In the present disclosure, such alkyl groups may be unsubstituted or may be substituted with one or more halogen. Where applicable for a given moiety (R), a tolerance for one or more non-halogen substituents within an alkyl group will be noted in the specification.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labelled compounds of the disclosure may generally be prepared by conventional techniques known to those skilled in the art or by processes analogous to those described herein, using an appropriate isotopically-labelled reagent in place of the non-labelled reagent otherwise employed.

The present disclosure is intended to include all hydration states of a given compound or formula, unless otherwise noted or when heating a material.

Aspects of this disclosure are directed to a method of producing hydrogen gas. The method of producing hydrogen gas comprises hydrolyzing sodium borohydride ($NaBH_4$) with water in the presence of $La(OH)_3/La_2O_3/CaSiO_3/g-C_3N_4$ particulate crystalline nanocomposite catalyst. The use of a particulate crystalline nanocomposite catalyst demonstrated excellent catalytic performance for the hydrolysis of $NaBH_4$, resulting in the generation of clean hydrogen rapidly and efficiently. This method, having a high hydrogen generation rate (HGR), has significant potential for energy storage and environmental applications.

According to a first aspect of the present disclosure, a method of producing hydrogen gas is described. The method of producing hydrogen gas comprises hydrolyzing $NaBH_4$ with water at a temperature of from about 20 to about 75 degrees Celsius (° C.), for example from about 21 to about 74° C., from about 22 to about 73° C., from about 23 to about 72° C., from about 24 to about 71° C., from about 25 to about 70° C., from about 26 to about 69° C., or from about 27 to about 68° C. in the presence of a particulate crystalline nanocomposite catalyst.

In some embodiments, $NaBH_4$ is hydrolyzed with water at a temperature of from about 25 to about 70° C., for example about 24 to about 69° C., from about 25 to about 68° C., from about 26 to about 67° C., from about 25 to about 66° C., from about 26 to about 65° C., or from about 27 to about 64° C. In a preferred embodiment, $NaBH_4$ is hydrolyzed with water at a temperature of about 28° C.

In some embodiments, $NaBH_4$ is hydrolyzed with water at a temperature of from about 35 to 60° C., for example from about 35.5 to about 59.5° C., from about 36 to about 59° C., from about 36.5 to about 58.5° C., from about 37 to about 58° C. or from about 37.5 to about 57.5° C. In a preferred embodiment, $NaBH_4$ is hydrolyzed with water at a temperature of about 38° C.

In some embodiments, the ratio by weight of $NaBH_4$ to the particulate crystalline nanocomposite catalyst is from about 1:1 to about 5:1, for example from about 1.5:1 to about 4.5:1, from about 2:1 to about 4:1, from about 2.5:1 to about 3.5:1. In some embodiments, the ratio by weight of $NaBH_4$ to the particulate crystalline nanocomposite catalyst is from about 1:1 to about 3:1, for example from about 1.1:1 to about 2.9:1, from about 1.2:1 to about 2.8:1, from about 1.3:1 to about 2.7:1, from about 1.4:1 to about 2.6:1, from about 1.5:1 to about 2.5:1, from about 1.6:1 to about 2.4:1, from about 1.7:1 to about 2.3:1, from about 1.8:1 to about 2.2:1, or from about 1.9:1 to about 2.1:1.

In embodiments of the hydrolysis method, the $NaBH_4$, in solid form, is mixed with the nanocomposite in solid form to provide a solid composition that is stable and storable at room temperature: there may be no decomposition to form hydrogen when the solid mixture of the $NaBH_4$ and the nanocomposite is stored under anhydrous conditions. The stable composition is later used as a source of hydrogen via the addition of water thereto. In alternate embodiments, the $NaBH_4$, in solid form and the nanocomposite are mixed immediately prior to contact with water.

It is preferred in the hydrolysis reaction that the median volume particle size (Dv50) of the nanocomposite catalyst is substantially less than the median volume particle size (Dv50) of the $NaBH_4$. The $NaBH_4$ may, for example, have a median volume particle size (Dv50) that is at least 5 or even at least 10 times the median volume particle size of the nanocomposite. Differences in the particle size between the two solids provide a means by which the rate of formation of hydrogen gas is buffered. For example, the rate of hydrogen gas formation achieved by adding liquid water to a mixture of particles of $NaBH_4$ and particles of the nanocomposite having essentially the same particle size may be from 2 to 6 times the rate of hydrogen formation provided by adding water to a mixture of particles of the $NaBH_4$ and the nanocomposite in which the $NaBH_4$ particles have an average particle size that is at least five times, preferably at least 10 times the particle size of the nanocomposite.

The hydrogen gas evolved as a hydrolysis product should be captured. This is often accomplished via gas collection equipment, such as inverted jars or specialized balloons, which allow the gas to gather securely. As the hydrogen forms, it is directed into these containers to keep it from escaping. Safety precautions are crucial since hydrogen is highly flammable. Once captured, hydrogen may be refined and stored for use in a variety of applications, including fuel cells and energy generation, making it an important resource for sustainable energy solutions.

In some embodiments, based on the weight of the $NaBH_4$, the method results in a hydrogen generation rate of about 100 to 1000 milliliters per minute per gram (mL min$^{-1}$ g$^{-1}$), for example about 110 to about 990 mL min$^{-1}$ g$^{-1}$, about 120 to about 980 mL min$^{-1}$ g$^{-1}$, about 130 to about 970 mL min$^{-1}$ g$^{-1}$, about 140 to about 960, about 150 to about 950 mL min$^{-1}$ g$^{-1}$, about 160 to about 940 mL min$^{-1}$ g$^{-1}$, about 170 to about 930 mL min$^{-1}$ g$^{-1}$, or about 180 to about 920 mL min$^{-1}$ g$^{-1}$. In a preferred embodiment, hydrogen generation rate is about 100 to about 1500 mL min$^{-1}$ g$^{-1}$ based on the weight of the sodium borohydride ($NaBH_4$). In yet another preferred embodiment, hydrogen generation rate is about 200 to about 1500 mL min$^{-1}$ g$^{-1}$ based on the weight of the sodium borohydride ($NaBH_4$).

In some embodiments, the method of hydrolysis of $NaBH_4$ with the particulate crystalline nanocomposite at a temperature of about 28° C. has a HGR of from about 100 to 1500 milliliters per minute per gram (mL min$^{-1}$ g$^{-1}$), for example from about 120 to about 1480 mL min$^{-1}$ g$^{-1}$, from about 140 to about 1480 mL min$^{-1}$ g$^{-1}$, from about 160 to about 1460 mL min$^{-1}$ g$^{-1}$ 1, from about 180 to about 1440 mL min$^{-1}$ g$^{-1}$ 1, from about 200 to about 1420 mL min$^{-1}$ g$^{-1}$, from about 220 to about 1400 mL min$^{-1}$ g$^{-1}$ 1, from about 240 to about 1380 mL min$^{-1}$ g$^{-1}$, based on the weight of the $NaBH_4$. In a preferred embodiment, the method of hydrolysis of $NaBH_4$ with the particulate crystalline nanocomposite at a temperature of about 28° C. has an HGR of about 250 mL min$^{-1}$ g$^{-1}$.

In some embodiments, the method of hydrolysis of $NaBH_4$ with the particulate crystalline nanocomposite at a temperature of about 200 to about 1500 mL min$^{-1}$ g$^{-1}$, for example about 250 to about 1450 mL min$^{-1}$ g$^{-1}$ 1, from about 300 to about 1400 mL min$^{-1}$ g$^{-1}$, from about 350 to about 1350 mL min$^{-1}$ g$^{-1}$ 1, from about 400 to about 1300 mL min$^{-1}$ g$^{-1}$, from about 450 to about 1250 mL min$^{-1}$ g$^{-1}$ 1, from about 500 to about 1200 mL min$^{-1}$ g$^{-1}$, from about 550 to about 1150 mL min$^{-1}$ g$^{-1}$, from about 600 to about 1100 mL min$^{-1}$ g$^{-1}$, from about 650 to about 1050 mL min$^{-1}$ g$^{-1}$, from about 700 to about 1000 mL min$^{-1}$ g$^{-1}$, of from about 750 to about 950 mL min$^{-1}$ g$^{-1}$, based on the weight of the $NaBH_4$. In a preferred embodiment, the method of hydrolysis of $NaBH_4$ with the particulate crystalline nanocomposite at a temperature of about 38° C. has an HGR of about 962.5 mL min$^{-1}$ g$^{-1}$.

In some embodiments, the method of present disclosure may be adapted to other borohydride salts, including, but not limited to, potassium borohydride, calcium borohydride, magnesium borohydride, aluminum borohydride, zinc borohydride, barium borohydride, cesium borohydride, rubidium borohydride, strontium borohydride, tetrabutylammonium borohydride, ammonium borohydride, trimethylammonium borohydride, benzyltrimethylammonium borohydride, potassium tetraphenylborate, lithium tetrafluoroborate, potassium tetrafluoroborate, sodium tetrafluoroborate, copper borohydride, nickel borohydride, iron borohydride, lead borohydride, copper(II) borohydride, thallium borohydride, gold borohydride, silver borohydride, rhodium borohydride, palladium borohydride, antimony borohydride, and/or combinations thereof may also be used.

The particulate crystalline nanocomposite comprises a hexagonal lanthanum hydroxide ($La(OH)_3$) crystalline phase; a lanthanum oxide ($La_2O_3$) crystalline phase; a monoclinic calcium silicate ($CaSiO_3$) crystalline phase; and, graphitic carbon nitride (g-$C_3N_4$) crystalline phase. In some embodiments, $La(OH)_3$ has a hexagonal crystalline phase. In some embodiments, $La_2O_3$ may exist in hexagonal, monoclinic, and/or cubic crystalline phases. In some embodiments, $CaSiO_3$ has a monoclinic crystalline phase. It is not precluded that $CaSiO_3$ may additionally exist in other crystalline phases, including triclinic and orthorhombic crystalline phases. In some embodiments, g-$C_3N_4$ has a cubic crystalline phase. At least a fraction of g-$C_3N_4$ is in the form of mesoporous nanosheets.

In some embodiments, at least about 50 wt. %, for example at least about 60 wt. %, at least about 70 wt. %, or at least about 80 wt. % of the g-$C_3N_4$ is in the form of mesoporous nanosheets. As used herein, the term mesoporous nanosheets refers to the ultrathin, two-dimensional materials that possess mesopores with diameters of from about 2 to about 50 nm and are distributed across their surface or within their layers. In preferred embodiments, at least about 80 wt. % of the g-$C_3N_4$ is in the form of mesoporous nanosheets.

In some embodiments, the ratio by weight of $CaSiO_3$ to g-$C_3N_4$ to the sum of $La(OH)_3$ and $La_2O_3$ in the particulate crystalline nanocomposite is about (0.80-1.20):(0.80-1.20):(0.80-1.20), for example about (0.85-1.15):(0.85-1.15):(0.85-1.15), about (0.90-1.10):(0.90-1.10):(0.90-1.10), or about (0.95-1.05):(0.95-1.05):(0.95-1.05). In a preferred embodiment, the ratio by weight of $CaSiO_3$ to g-$C_3N_4$ to the sum of $La(OH)_3$ and $La_2O_3$ in the particulate crystalline nanocomposite is about 1:1:1.

The metal oxide nanoparticles include nanocomposite may exist in various morphological shapes, such as nanotubes, nanowires, nanoribbons, nanoblocks, nanobarrels, nanowhiskers, and mixtures thereof. In a preferred embodiment, the particulate crystalline nanocomposite includes acicular particles of $La(OH)_3$, $La_2O_3$, and $CaSiO_3$. As used herein, acicular particles refer to needle-like structures characterized by their elongated, slender form and high aspect ratio (ratio of length to width), resembling thin, sharp needles. In certain embodiment, the acicular particles are disposed on g-$C_3N_4$ nanosheets and have an aspect ratio of at least about 3:1, for example at least about 4:1, at least about 5:1, at least about 6:1, at least about 7:1, at least about 8:1, at least about 9:1, or at least about 10:1.

In some embodiments, the particulate crystalline nanocomposite includes acicular particles of $La(OH)_3$, $La_2O_3$, and $CaSiO_3$ with a median length of from about 40 to about 100 nm, for example from about 45 to about 95 nm, from about 50 to about 90 nm, from about 55 to about 85 nm, of from about 60 to about 80 nm, as determined by transmission electron microscopy. In a preferred embodiment, the particulate crystalline nanocomposite includes acicular particles of $La(OH)_3$, $La_2O_3$, and $CaSiO_3$ having a median length of about 77.8 nm.

In some embodiments, the particulate crystalline nanocomposite includes aggregates of the mesoporous nanosheets of g-$C_3N_4$ with nanoparticles of $La(OH)_3$, $La_2O_3$, and $CaSiO_3$. A two-dimensional porous structure is formed using curled and wrinkled nanosheets and platelets of g-$C_3N_4$, which enhance surface area and prevent stacking. The surface is decorated with well-dispersed needle-like metal oxide nanoparticles, along with a few aggregates, indicating successful integration of metal oxides onto the g-$C_3N_4$ matrix.

In some embodiments, the particulate crystalline nanocomposite has a surface area of from about 60 to about 100 square meter per gram ($m^2$/g), for example from about 62 to about 98 $m^2$/g, from about 64 to about 96 $m^2$/g, from about 66 to 94 $m^2$/g, from about 68 to about 92 $m^2$/g, from about 70 to about 90 $m^2$/g, from about 72 to about 88 $m^2$/g, from about 74 to about 86 $m^2$/g, or from about 76 to about 84 $m^2$/g, as determined by BET analysis.

In some embodiments, the particulate crystalline nanocomposite has a surface area of from about 70 to about 90 $m^2$/g, from about 71 to about 89 $m^2$/g, from about 72 to about 88 $m^2$/g, from about 73 to about 87 $m^2$/g, from about 74 to about 86 $m^2$/g, from about 75 to about 85 $m^2$/g, from about 76 to about 84 $m^2$/g, or from about 77 to about 83 $m^2$/g, as determined by BET analysis. In a preferred embodiment, the surface area of the particulate crystalline nanocomposite determined by BET analysis is about 82.3 $m^2$/g.

In some embodiments, the particulate crystalline nanocomposite has an average pore diameter of from about 10 to about 25 nm, for example from about 11 to about 24 nm, from about 12 to about 23 nm, or from about 13 to about 22 nm, as determined by BJH desorption analysis. In a preferred embodiment, the particulate crystalline nanocomposite has an average pore diameter of about 14.27 nm.

In some embodiments, the particulate crystalline nanocomposite has a pore volume of from about 0.1 to about 0.4 $cm^3$/g, for example from about 0.12 to about 0.38 $cm^3$/g, from about 0.14 to about 0.36 $cm^3$/g, from about 0.16 to about 0.34 $cm^3$/g, from about 0.18 to about 0.32 $cm^3$/g, or from about 0.20 to about 0.30 $cm^3$/g, as determined by BJH desorption analysis.

In some embodiments, the particulate crystalline nanocomposite has a pore volume of about 0.1 to about 0.3 $cm^3$/g, for example from about 0.11 to about 0.29 $cm^3$/g, from about 0.12 to 0.28 $cm^3$/g, from about 0.13 to about 0.27 $cm^3$/g, from about 0.14 to about 0.26 $cm^3$/g, from about 0.15 to about 0.25 cm$^3$/g, from about 0.16 to about 0.24 cm$^3$/g, or from about 0.17 to about 0.23 cm$^3$/g, as determined by BJH desorption analysis. In a preferred embodiment, the particulate crystalline nanocomposite has a pore volume of about 0.220 cm$^3$/g.

In some embodiments, the particulate crystalline nanocomposite has a hysteresis loop of Type H3 (International Union of Pure and Applied Chemistry (IUPAC) classification), as determined by N$_2$ adsorption-desorption analysis at 77 Kelvin (K). The H3 hysteresis loop is common in materials composed of plate-like particles, such as layered or sheet-like structures, and reflects the presence of slit-shaped mesopores without pore filling at high relative pressures.

Figure 1:
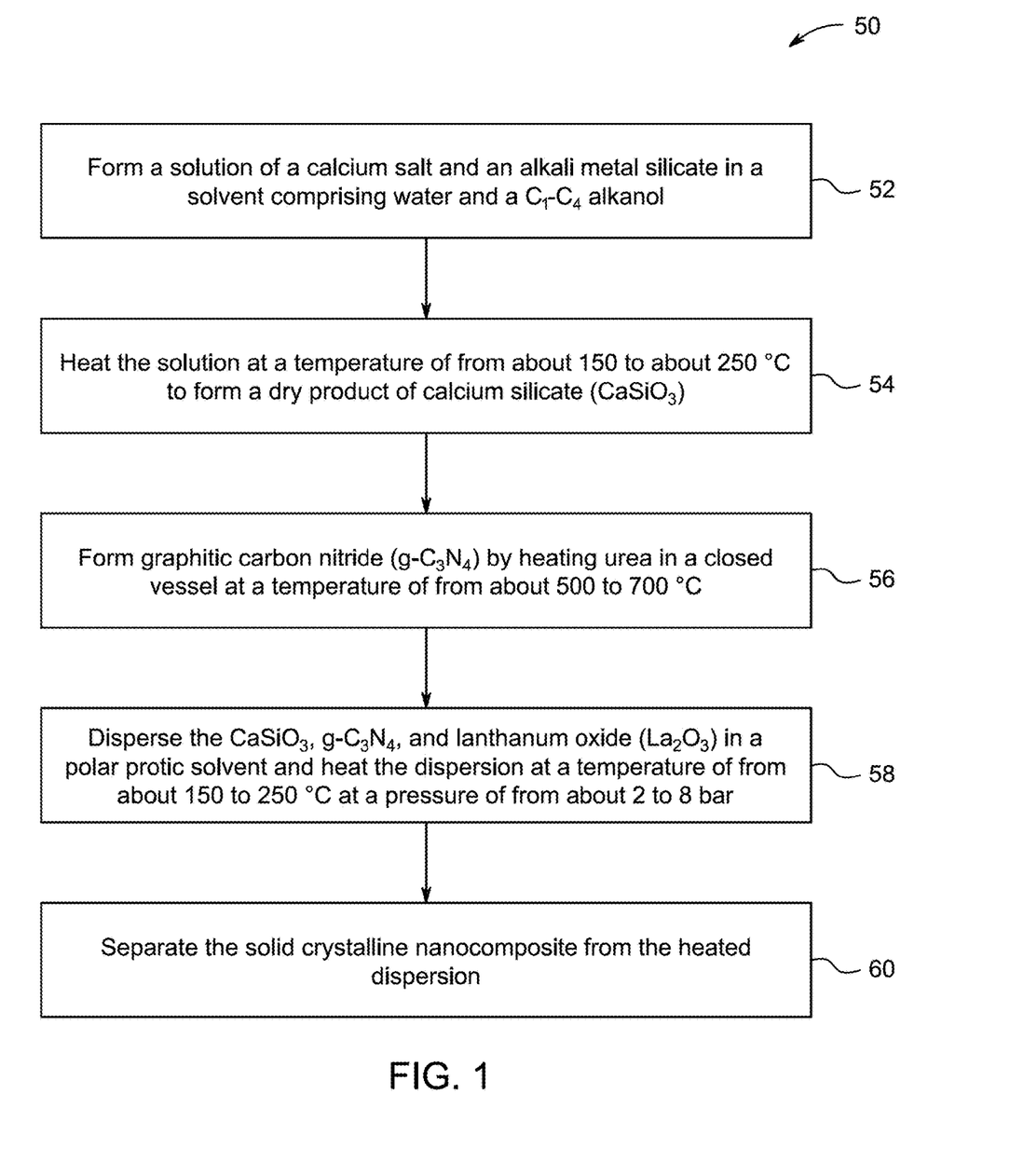
FIG. 1 is an exemplary flowchart for a method of preparing a $La(OH)_3$/$La_2O_3$/$CaSiO_3$/g-$C_3N_4$ particulate crystalline nanocomposite, according to certain embodiments.

FIG. 1 illustrates a flow chart of a method 50 of preparing the La(OH)$_3$/La$_2$O$_3$/CaSiO$_3$/g-C$_3$N$_4$ particulate crystalline nanocomposite. The precipitation method is a widely used and straightforward technique for synthesizing nanomaterials. The above-mentioned method involves the controlled formation of solid particles from a solution through chemical reactions that lead to supersaturation and subsequent nucleation. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes forming a solution of a calcium salt and an alkali metal silicate in a solvent including water and a C$_1$-C$_4$ alkanol. Exemplary calcium salts, which may be present alone or in combination, include but are not limited to calcium chloride, calcium sulfate, calcium carbonate, calcium phosphate, calcium acetate, calcium citrate, calcium lactate, calcium gluconate, calcium formate, calcium oxalate, calcium tartrate, calcium ascorbate, calcium benzoate, calcium propionate, calcium stearate, calcium hydroxide, calcium peroxide, calcium iodate, calcium molybdate, calcium hypochlorite, calcium thiocyanate, calcium chromate, calcium ferrite, calcium bromide, calcium fluoride, calcium sulfide, calcium arsenate, calcium tungstate, calcium borate, calcium perchlorate, and calcium hydride. In an embodiment, the calcium salt is selected from the group consisting of calcium sulfate (CaSO$_4$), calcium nitrate (Ca(NO$_3$)$_2$), calcium chloride (CaCl$_2$)) and calcium acetate (Ca(CH$_3$COO)$_2$). In a preferred embodiment, calcium salt is calcium nitrate.

Exemplary alkali metal silicates, which may be present alone or in combination, include but are not limited to potassium silicate, lithium silicate, rubidium silicate, cesium silicate, sodium orthosilicate, potassium orthosilicate, lithium orthosilicate, rubidium orthosilicate, cesium orthosilicate, sodium disilicate, potassium disilicate, lithium disilicate, rubidium disilicate, cesium disilicate, sodium trisilicate, potassium trisilicate, lithium trisilicate, rubidium trisilicate, cesium trisilicate, sodium tetrasilicate, potassium tetrasilicate, lithium tetrasilicate, rubidium tetrasilicate, cesium tetrasilicate, sodium hexasilicate, potassium hexasilicate, lithium hexasilicate, rubidium hexasilicate, and cesium hexasilicate. In a preferred embodiment, alkali metal silicate is sodium metasilicate.

In some embodiments, the molar ratio of the calcium salt to the alkali metal silicate is from about 1:5 to 5:1, for example about 1:4 to 4:1, about 3:1 to 1:3, about 1:2 to 2:1, or about 1:1.

Exemplary C1-C4 alkanols, which may be present alone or in combination, include but are not limited to methanol, propanol, isopropanol, butanol, isobutanol, sec-butanol, tert-butanol, 1-propanol, 2-propanol, 1-butanol, 2-butanol, methylpropanol, dimethylpropanol, ethylpropanol, cyclopropanol, fluoromethanol, chloromethanol, bromomethanol, and iodomethanol. In a preferred embodiment, the C1-C4 alkanol comprises or consists of ethanol.

In an embodiment of step 52, the volume-to-volume (v/v) ratio of water to C1-C4 alkanol is in the range of about 1:5 to 5:1, for example about 1:4 to 4:1, about 1:3 to 3:1, or about 1:2 to 2:1. In a preferred embodiment, the v/v ratio of water to C1-C4 alkanol is 1:1.

At step 54, the method 50 includes heating the solution at a temperature of from about 150 to about 250° C. to form a dry product of CaSiO$_3$. This step involves the chemical reaction and dehydration process that are necessary for converting the precursor materials into the desired solid product. In some embodiments, heating takes place at temperature of from about 110 to about 210° C., for example from about 120 to about 220° C., from about 130 to about 230° C., from about 140 to about 220° C., from about 150 to about 210° C., from about 160 to about 200° C., from about 170 to about 190° C., or about 180° C. to form the dry product of CaSiO$_3$. The solution is preferably heated in an autoclave; optionally, other known heating appliances may be used.

At step 56, the method 50 includes forming graphitic-C$_3$N$_4$ by heating urea in a closed vessel at a temperature of from about 500 to about 700° C. Heating is done in a closed vessel at step 56 to maintain a controlled atmosphere, preventing the escape of volatile components and ensuring the formation of graphitic-C$_3$N$_4$ under the required conditions of pressure and temperature. In some embodiments, heating takes place at temperature of from about 500 to about 700° C., for example from about 525 to about 675° C., from about 550 to about 650° C., from about 575 to about 625° C., or about 600° C. Typically, heating is conducted for a period of from about 30 to 60 minutes, for example about 40 to about 50 minutes, or about 45 minutes. In an exemplary preferred embodiment, the urea is heated in a closed vessel to a temperature of about 600° C. for a period of about 45 minutes.

At step 58, the method 50 comprises dispersing the CaSiO$_3$, g-C$_3$N$_4$, and La$_2$O$_3$ in a polar protic solvent and heating the dispersion at a temperature of from about 150 to about 250° C. at a pressure of from about 2 to about 8 bar. In some embodiments, the CaSiO$_3$, g-C$_3$N$_4$, and La$_2$O$_3$ are dispersed in a polar protic solvent and heating the dispersion at a temperature of from about 150 to 250° C., preferably 155 to 245° C., preferably 160 to 240° C., preferably 165 to 235° C., preferably 170 to 230° C., and preferably 175 to 225° C. at a pressure of from about 2.0 to 8.0 bar, preferably 2.5 to 7.5 bar, preferably 3.0 to 7.0 bar, preferably 3.5 to 6.5 bar, preferably 4.0 to 6.0 bar, and preferably 4.5 to 5.5 bar.

Exemplary polar protic solvents include, but are not limited to, methanol, isopropanol, n-propanol, butanol, isobutanol, tert-butanol, pentanol, hexanol, cyclohexanol, ethylene glycol, propylene glycol, glycerol, formamide, mono(C$_1$-C$_4$)alkyl ethers of ethylene glycol, mono(C$_1$-C$_4$) alkyl ethers of propylene glycol dimethylformamide (DMF), acetic acid, propionic acid, lactic acid, formic acid, citric acid, phosphoric acid, trifluoroacetic acid, water, ammonia, methylamine, ethylamine, isopropylamine, n-propylamine, butylamine, sec-butylamine, tert-butylamine, diethylamine, dipropylamine, dimethylamine, triethylamine, triethanolamine, n-methylformamide (NMF), n-methylacetamide (NMA), hydrazine, hydroxylamine, and urea. In an exemplary embodiment, the polar protic solvent is a C$_1$-C$_4$ alkanol. In a preferred embodiment, the polar protic solvent is selected from the group consisting of mono(C$_1$-C$_4$)alkyl ethers of ethylene glycol. An exemplary polar protic solvent is ethylene glycol monomethyl ether.

In some embodiments, the dispersion is heated: at a temperature of from about 150 to about 250° C.; and, at a pressure of from about 3 to 6 bar. In a preferred embodiment, the $CaSiO_3$, g-$C_3N_4$, and $La_2O_3$ are dispersed in a polar protic solvent, and the dispersion is heated at a temperature of about 180° C. at a pressure of about 5 bar.

Such heating of the dispersion may, in certain embodiments, be conducted for a duration of from about 3 to about 6 hours, for example from about 3.2 to about 5.8 hours, from about 3.4 to 5.6 hours, from about 3.6 to 5.4 about hours, or from about 3.8 to about 5.2 hours.

At step 60, the method 50 includes separating the solid particulate crystalline nanocomposite from the heated dispersion. In some embodiments, separation may be done by centrifugation, decantation, sedimentation, dialysis, ultrafiltration, distillation, fractional distillation, steam distillation, vacuum distillation, crystallization, recrystallization, adsorption, absorption, chromatography, electrophoresis, membrane filtration, solvent extraction, sublimation, coagulation, and flotation. In a preferred embodiment, the solid particulate crystalline nanocomposite is separated from the heated dispersion by filtration.

It is not precluded that the separated particulate crystalline nanocomposite is subjected to further processing. Such further processing may be performed in a single stage or multistage manner and may include one or more of: washing with water; drying; and, comminuting the nanocomposite in order to moderate particle morphology or the particle size distribution thereof. Exemplary drying conditions include a temperature of from about 50 to about 200° C., such as from about 100 to about 200° C. or from about 120 to about 180° C. Such drying may be carried out using known heating methods, such as a vacuum oven, rotary evaporator, microwave-assisted drying process, freeze-drying, and infrared drying.

EXAMPLES

The following examples demonstrate a method for producing hydrogen gas by using $La(OH)_3$/$La_2O_3$/$CaSiO_3$/g-$C_3N_4$ particulate crystalline nanocomposite (herein referred to as a nanocomposite) as a catalyst. The examples are provided solely for illustration and are not to be construed as limitations of the present disclosure, as many variations thereof are possible without departing from the scope of the present disclosure.

Example 1: Fabricating the Lanthanum Hydroxide ($La(OH)_3$)/Lanthanum oxide ($La_2O_3$)/Calcium silicate ($CaSiO_3$)/Graphitic carbon nitride (g-$C_3N_4$)

Equimolar amounts of calcium nitrate and sodium metasilicate were dispersed in 100 milliliters (mL) of ethanol:water (1:1 ratio by volume) in a 150 mL glass beaker and sonicated for 15 minutes (min). The mixture was then transferred to a 200 mL autoclave and placed in an oven operated at 180 degrees Celsius (° C.) for 2.0 hours (h). The product was further dispersed in 500 mL distilled water with an ultrasonic bath for 10 minutes, filtered via a Buchner system, rinsed with distilled water, and dried at 120° C. for 1.0 hour.

Example 2: Fabricating the Graphitic Carbon Nitride (g-$C_3N_4$)

About 30.0 gram (g) of urea was placed in a 100 mL porcelain crucible and closed with its porcelain cover. The whole crucible and cover were wrapped with three layers of aluminum foil to reduce the urea loss of evaporation. The crucible was then heated via a furnace set at 600° C. for 1.0 hour.

Example 3: Fabricating the Lanthanum Hydroxide $La(OH)_3$/$La_2O_3$/$CaSiO_3$@g-$C_3N_4$ An equal amount by weight of $CaSiO_3$, g-$C_3N_4$, and lanthanum oxide ($La_2O_3$) was transferred to a mono wave-200 vial (G30) and dispersed in 20 mL ethylene glycol monomethyl ether via an ultrasonic bath for 30 minutes. The vial was then closed with its Teflon cover and placed in the Anton-Baar Monowave-200 operated at 180° C. and 5.0 bar pressure for one hour. The product formed was then dispersed in 1 liter (L) of distilled water with an ultrasonic bath for 30 minutes, filtered via a Buchner system, rinsed with distilled water, and dried at 150° C. for 2.0 hours.

Figure 2:
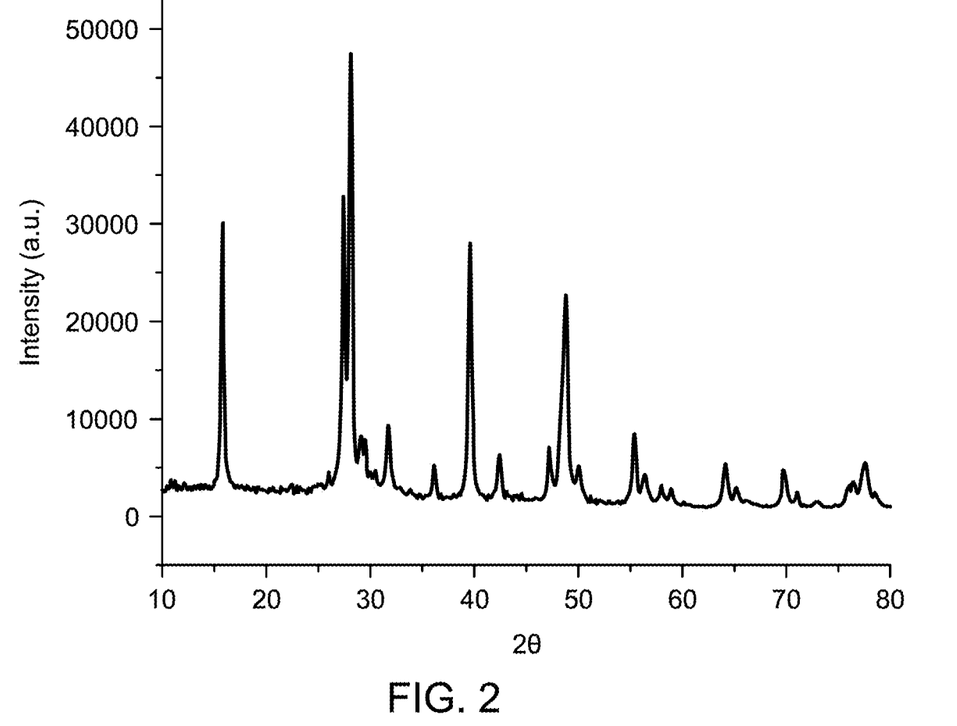
FIG. 2 shows an X-ray diffraction (XRD) diffractogram of the $La(OH)_3$/$La_2O_3$/$CaSiO_3$/g-$C_3N_4$ nanocomposite, according to certain embodiments.

The crystallinity of, and phases present in the $La(OH)_3$/$La_2O_3$/$CaSiO_3$@g-$C_3N_4$ nanocomposite were analyzed by X-ray diffraction (XRD), and the results are given in FIG. 2. The intense peaks and high intensity values indicate that the powder is highly crystalline in nature. In addition, the peak broadening in the spectra indicates the small particle size of the prepared composites. Examination of the diffraction patterns with the standard JCPDS cards reveals the presence of metallic $La(OH)_3$, $La_2O_3$, $CaSiO_3$, and g-$C_3N_4$. The strong reflections at 2θ values of 15.8°, 27.2°, 28.2°, 39.4°, 48.2°, 49.0°, and 55.5° were well-matched with the hexagonal phase of $La(OH)_3$ (JCPDS Card No. 00-036-1481, the disclosure of which is incorporated herein by reference in its entirety). These diffractions were assigned to (100), (110), (101), (201), (300), (211) and (112) planes. The $CaSiO_3$ monoclinic phase (JCPDS Card No. 00-001-0720, the disclosure of which is incorporated herein by reference in its entirety) was detected at 2θ values of 27.5°, 32.1°, 36.6° and 49.8°. The diffractions related to g-$C_3N_4$ was observed at 16.0°, and 39.8° (COD No. 1534042 and JCPDS Card No. 00-050-1250, the disclosures of which are incorporated herein by reference in their entirety). The weak diffractions of both $CaSiO_3$ and g-$C_3N_4$ may be attributed to the semi-crystalline nature of these phases and the high crystallinity of $La(OH)_3$ phase in the prepared composite. Weak diffraction corresponding to $La_2O_3$ were detected at 2θ values 29.0° and 50.1° (JCPDS Card No. 01-083-1345, the disclosure of which is incorporated herein by reference in its entirety). No other phases were detected indicating the successful fabrication of $La(OH)_3$/$La_2O_3$/$CaSiO_3$@g-$C_3N_4$.

Figure 3A:
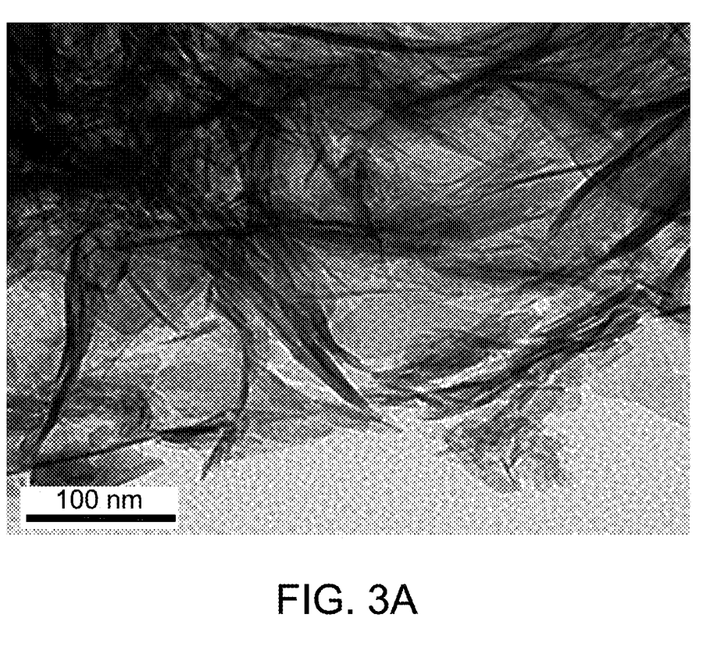
FIG. 3A shows a transmission electron microscopy (TEM) image of the $La(OH)_3La_2O_3$/$CaSiO_3$/g-$C_3N_4$ nanocomposite at 100 nanometers (nm) resolution, according to certain embodiments.
Figure 3B:
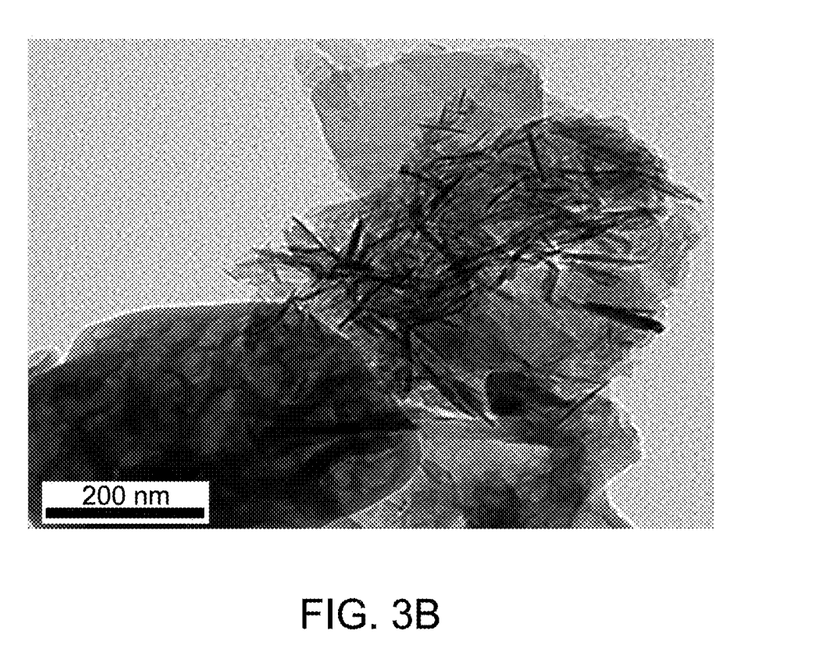
FIG. 3B shows the TEM image of the $La(OH)_3$/$La_2O_3$/$CaSiO_3$/g-$C_3N_4$ nanocomposite at 200 nm resolution, according to certain embodiments.
Figure 3C:
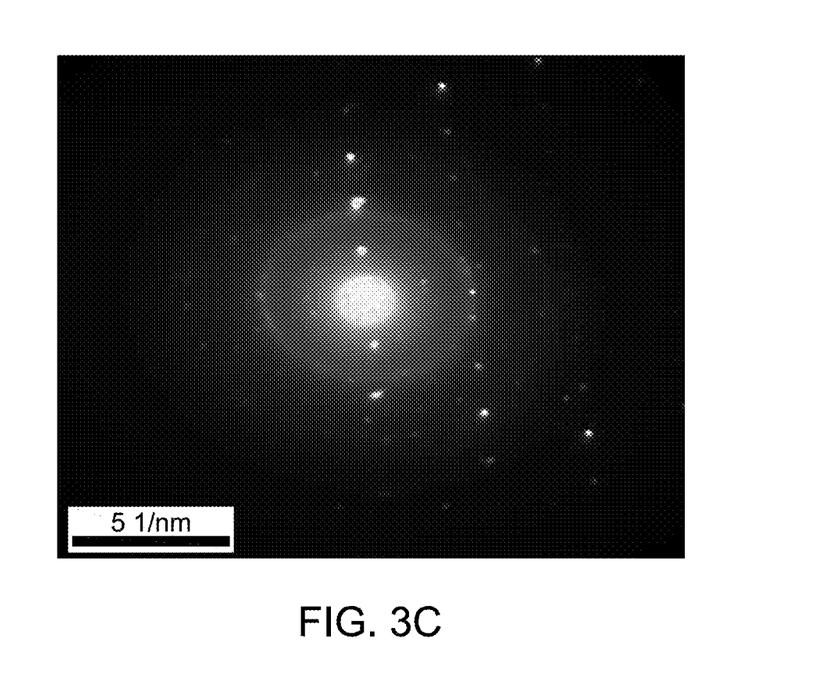
FIG. 3C shows a selected area electron diffraction (SAED) pattern of the $La(OH)_3La_2O_3$/$CaSiO_3$/g-$C_3N_4$ nanocomposite, according to certain embodiments.
Figure 3D:
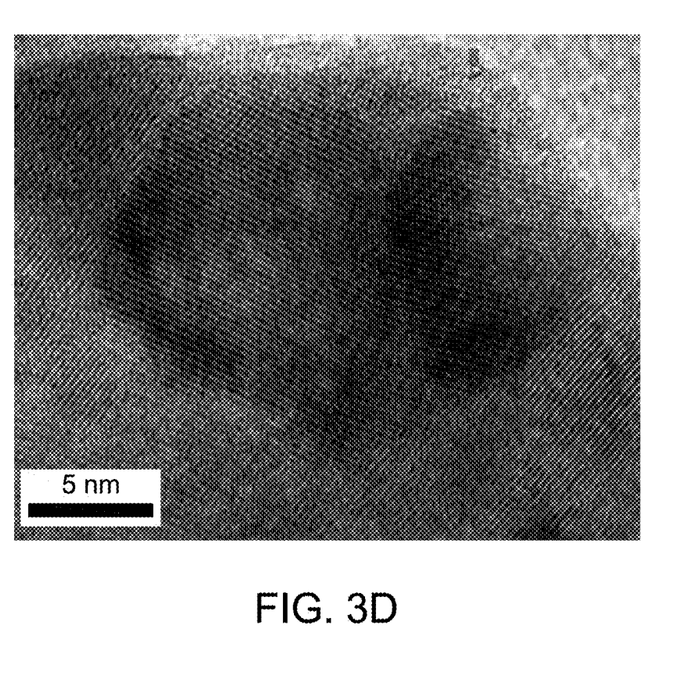
FIG. 3D shows a high-resolution transmission electron microscopy (HRTEM) of the $La(OH)_3$/$La_2O_3$/$CaSiO_3$/g-$C_3N_4$ nanocomposite, according to certain embodiments.
Figure 3E:
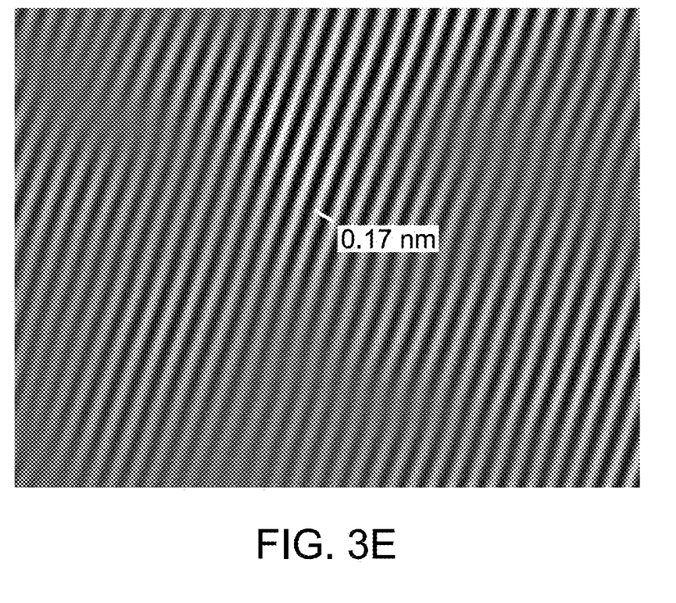
FIG. 3E shows an inverse Fast Fourier transform (IFFT) measurement of the HRTEM image of the $La(OH)_3$/$La_2O_3$/$CaSiO_3$/g-$C_3N_4$ nanocomposite, according to certain embodiments.
Figure 3F:
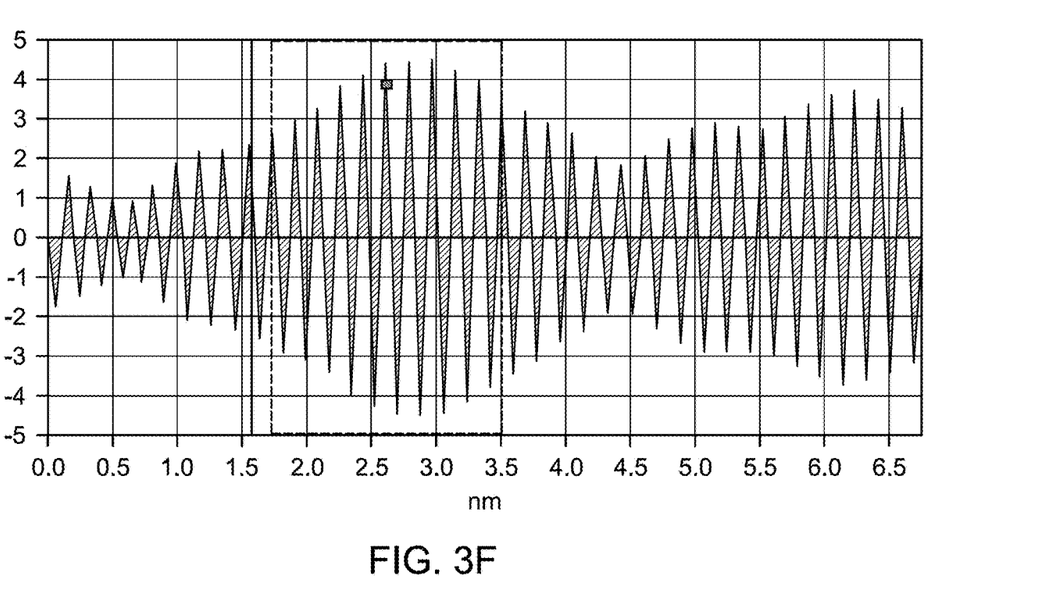
FIG. 3F shows a statistical line profile of IFFT for HRTEM image of $La(OH)_3$/$La_2O_3$/$CaSiO_3$/g-$C_3N_4$ nanocomposite showing the d-spacing value, according to certain embodiments.

Transmission electron microscopy (TEM) images of the nanocomposite are depicted in FIG. 3. The TEM images showed that two-dimensional porous structure constructed with curled and wrinkled nanosheets and platelets of the g-$C_3N_4$ (FIG. 3A and FIG. 3B). The image shows a dispersion of needle-like particles having an average length of 77.8 nanometer (nm) and some aggregates of metal oxides nanoparticles on nanosheets of g-$C_3N_4$. The high-resolution transmission electron microscopy (HRTEM) image of the composite, as shown in FIG. 3C, shows a plane spacing of 0.198 nm, 0.193 nm, 0.164 nm and 0.145 nm related to the ($CaSiO_3$: 313), ($CaSiO_3$: 123, $La(OH)_3$: 100, g-$C_3N_4$; 111), ($CaSiO_3$: 440) ($CaSiO_3$: 043, $La(OH)_3$: 311), planes. The corresponding selected area electron diffraction (SAED) pattern of the composite shown in FIG. 3D reveals diffraction spots with interplanar spacing of 0.525 nm, 0.287 nm, 0.215 nm, and 0.175 nm due to ($CaSiO_3$: 210, $La(OH)_3$: 100), ($CaSiO_3$: 212, $La(OH)_3$:200, g-$C_3N_4$: 200), ($CaSiO_3$: 60-2, $La(OH)_3$: 210), ($CaSiO_3$: 20-4, $La(OH)_3$: 102, $La_2O_3$;

200), diffraction planes. The Fast Fourier transform (FFT) and inverse Fast Fourier transform (IFFT) measurements (FIG. 3E and FIG. 3F) show a d value of 0.17 nm given to the nanocomposite, signifying the lattice spacing of ($La_2O_3$: 112, $CaSiO_3$:033).

Figure 4A:
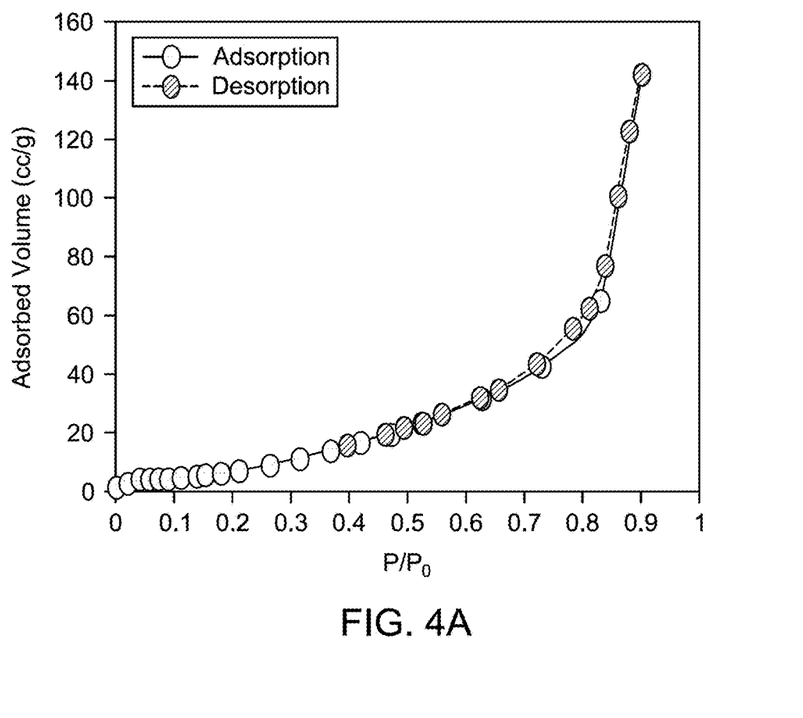
FIG. 4A shows $N_2$ adsorption-desorption isotherms of the $La(OH)_3$/$La_2O_3$/$CaSiO_3$/g-$C_3N_4$ nanocomposite, according to certain embodiments.
Figure 4B:
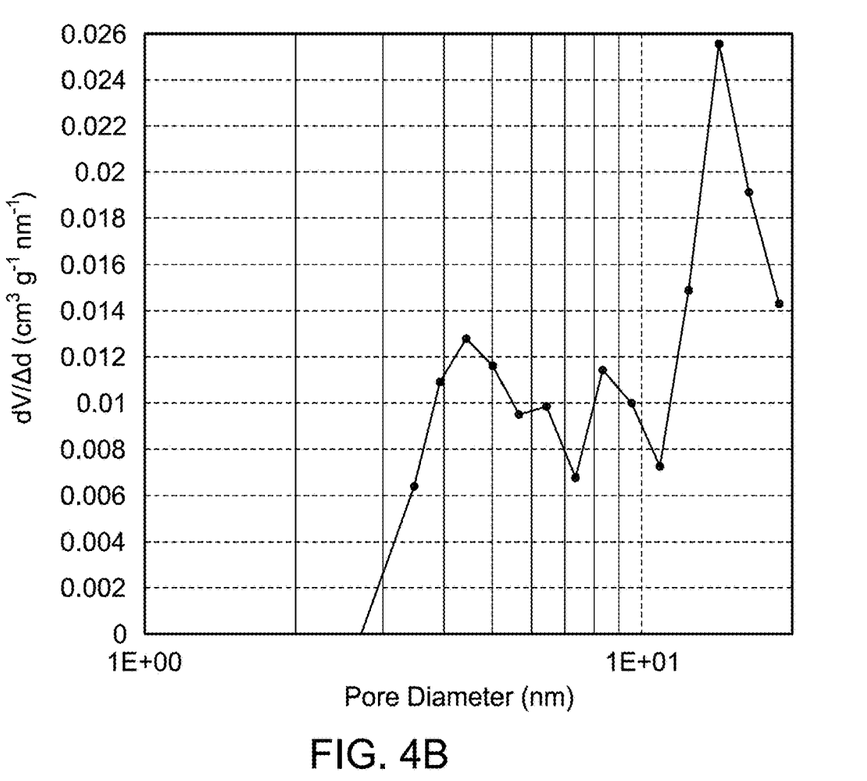
FIG. 4B shows the pore size distribution curves for the $La(OH)_3$/$La_2O_3$/$CaSiO_3$/g-$C_3N_4$ nanocomposite, plotted using the Barrett-Joyner-Halenda (BJH) method, according to certain embodiments.

The specific surface area of the prepared nanocomposite was determined using Brunauer-Emmett-Teller (BET) analysis. FIG. 4 displays the nitrogen adsorption-desorption isotherms of the nanocomposite. The nitrogen sorption isotherm of the composite belongs to type IV isotherm with a narrow hysteresis loop, indicating the formation of mesoporous structures. However, shifting the loop to a relatively higher pressure ($P/P_0$=0.72-1) suggests the presence of wide mesopores, which may result from the deposition of metal oxide particles in the wide pores of g-$C_3N_4$. Furthermore, the BET surface area of the nanocomposite (FIG. 4A) was calculated to be 82.3 square meters per gram ($m^2 g^{-1}$). The marked high specific surface area reflects the good dispersion of these metal oxide nanoparticles on g-$C_3N_4$. and $CaSiO_3$. Moreover, the pore size distribution curves, plotted using the Barrett-Joyner-Halenda (BJH) method shown in FIG. 4B for the nanocomposite exhibited average pore diameters maximized at 14.27 nm and pore volume of 0.220 cubic centimeter per gram ($cm^3 g^{-1}$). All the isotherms belong to the category H3 type of pores, which do not exhibit limiting adsorption at high $P/P_0$ and arise due to aggregation of plate-like particles giving rise to slit-shaped pores. This indicates that the assembly of the nanocomposite provoked a mesoporous structure.

Figure 5:
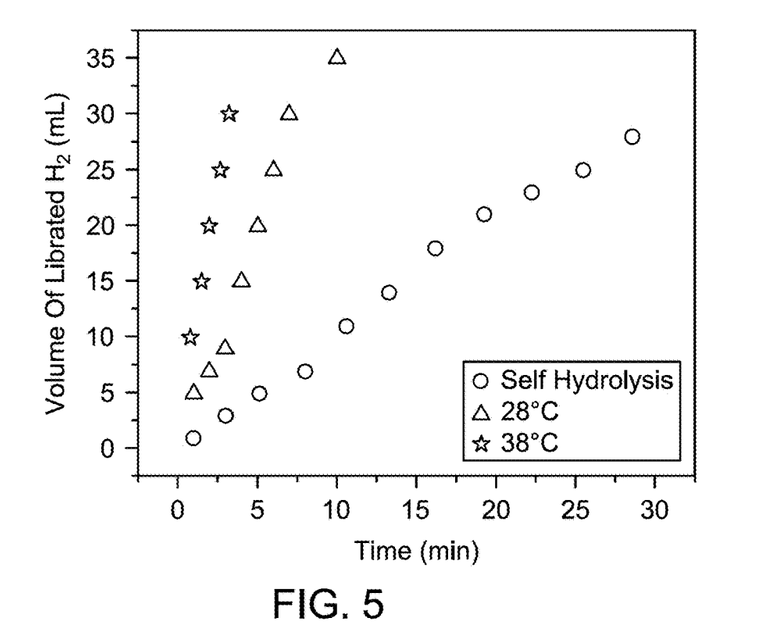
FIG. 5 shows the variation of the volume of liberated $H_2$ with reaction time over the $La(OH)_3$/$La_2O_3$/$CaSiO_3$/g-$C_3N_4$ nanocomposite, according to certain embodiments.

The results of hydrolysis of sodium hydroxide ($NaBH_4$) with and without 0.5 g of the $La(OH)_3 La_2O_3/CaSiO_3$/g-$C_3N_4$ nanocomposite catalyst are shown in FIG. 5. The catalytic action of the $La(OH)_3/La_2O_3/CaSiO_3$/g-$C_3N_4$ nanocomposite was clearly observed where the catalytic reaction exhibited catalytic activity higher than the self-hydrolysis process. According to the data analysis, hydrogen gas volume rises gradually over time. In addition, the catalytic hydrolysis reaction increases with increasing the reaction temperature. Results demonstrate that, on using 0.7 g of $NaBH_4$—relative to 0.5 g of the $La(OH)_3/La_2O_3/CaSiO_3$/g-$C_3N_4$ nanocomposite—values of hydrogen generation rate (HGR) of 250 and 962.5 milliliters per minute per gram (mL $min^{-1} g^{-1}$) were obtained at reaction temperatures of 28° C. and 38° C., respectively.

Numerous modifications and variations of the present disclosure are possible in light of the above teachings. It is therefore to be understood that within the scope of the appended claims, the invention may be practiced otherwise than as specifically described herein.

The invention claimed is:

1. A method of producing hydrogen gas, comprising:
   hydrolyzing sodium borohydride ($NaBH_4$) with water at a temperature of from about 20 to about 75° C. in the presence of a particulate crystalline nanocomposite catalyst,
   wherein the ratio by weight of sodium borohydride to the particulate crystalline nanocomposite catalyst is from about 1:1 to about 5:1,
   wherein the particulate crystalline nanocomposite catalyst comprises:
      a hexagonal lanthanum hydroxide ($La(OH)_3$) crystalline phase;
      a lanthanum oxide ($La_2O_3$) crystalline phase;
      a monoclinic calcium silicate ($CaSiO_3$) crystalline phase; and,
      a graphitic carbon nitride (g-$C_3N_4$) crystalline phase,
   wherein at least a fraction of the g-$C_3N_4$ is in the form of mesoporous nanosheets.

2. The method according to claim 1, wherein the ratio by weight of $CaSiO_3$ to g-$C_3N_4$ to the sum of $La(OH)_3$ and $La_2O_3$ in the particulate crystalline nanocomposite is about (0.8-1.2):(0.8-1.2):(0.8-1.2).

3. The method according to claim 1, wherein the particulate crystalline nanocomposite comprises acicular particles of $La(OH)_3$, $La_2O_3$, and $CaSiO_3$.

4. The method according to claim 1, wherein the particulate crystalline nanocomposite comprises acicular particles of $La(OH)_3$, $La_2O_3$, and $CaSiO_3$ having a median length of from about 40 to about 100 nanometers (nm), as determined by transmission electron microscopy (TEM).

5. The method according to claim 1, wherein at least about 80 weight percent (wt. %) of the g-$C_3N_4$ is in the form of mesoporous nanosheets.

6. The method according to claim 1, wherein the particulate crystalline nanocomposite has a surface area of from about 60 to about 100 square meters per gram ($m^2$/g), as determined by Brunauer-Emmett-Teller (BET) analysis.

7. The method according to claim 1, wherein the particulate crystalline nanocomposite has a surface area of from about 70 to about 90 $m^2$/g, as determined by BET analysis.

8. The method according to claim 1, wherein the particulate crystalline nanocomposite has an average pore diameter of from about 10 to about 25 nm, as determined by Barrett-Joyner-Halenda (BJH) desorption analysis.

9. The method according to claim 1, wherein the particulate crystalline nanocomposite has an average pore diameter of from about 10 to about 20 nm, as determined by BJH desorption analysis.

10. The method according to claim 1, wherein the particulate crystalline nanocomposite has a pore volume of from about 0.1 to about 0.4 cubic centimeters per gram ($cm^3$/g), as determined by BJH desorption analysis.

11. The method according to claim 1, wherein the particulate crystalline nanocomposite has a pore volume of from about 0.1 to about 0.3 $cm^3$/g, as determined by BJH desorption analysis.

12. The method according to claim 1, wherein the particulate crystalline nanocomposite has a hysteresis loop of Type H3 (international union of pure and applied chemistry (IUPAC) Classification), as determined by $N_2$ adsorption-desorption analysis at 77K.

13. The method according to claim 1 further comprising preparing the particulate crystalline nanocomposite by:
   forming a solution of a calcium salt and an alkali metal silicate in a solvent including water and a $C_1$-$C_4$ alkanol;
   heating the solution at a temperature of from about 150 to about 250° C. to form a dry product of $CaSiO_3$;
   forming g-$C_3N_4$ by heating urea in a closed vessel at a temperature of from about 500 to about 700° C.;
   dispersing the $CaSiO_3$, g-$C_3N_4$, and $La_2O_3$ in a polar protic solvent and heating the dispersion at a temperature of from about 150 to about 250° C. at a pressure of from about 2 to about 8 bar; and,
   separating the solid crystalline nanocomposite from the heated dispersion.

14. The method according to claim 1, wherein the ratio by weight of $NaBH_4$ to the particulate crystalline nanocomposite catalyst is from about 1:1 to about 3:1.

15. The method according to claim 1, wherein $NaBH_4$ is hydrolyzed with water at a temperature of from about 25 to about 70° C.

16. The method according to claim 1, wherein $NaBH_4$ is hydrolyzed with water at a temperature of from about 35 to about 60° C.

17. The method according to claim 1 having a hydrogen generation rate of from about 100 to about 1500 milliliters per minute per gram ($mL\ min^{-1}\ g^{-1}$) based on the weight of the $NaBH_4$.

18. The method according to claim 1 having a hydrogen generation rate of from about 200 to about 1500 $mL\ min^{-1}\ g^{-1}$ 1 based on the weight of the $NaBH_4$.

\* \* \* \* \*